Patented Jan. 10, 1939

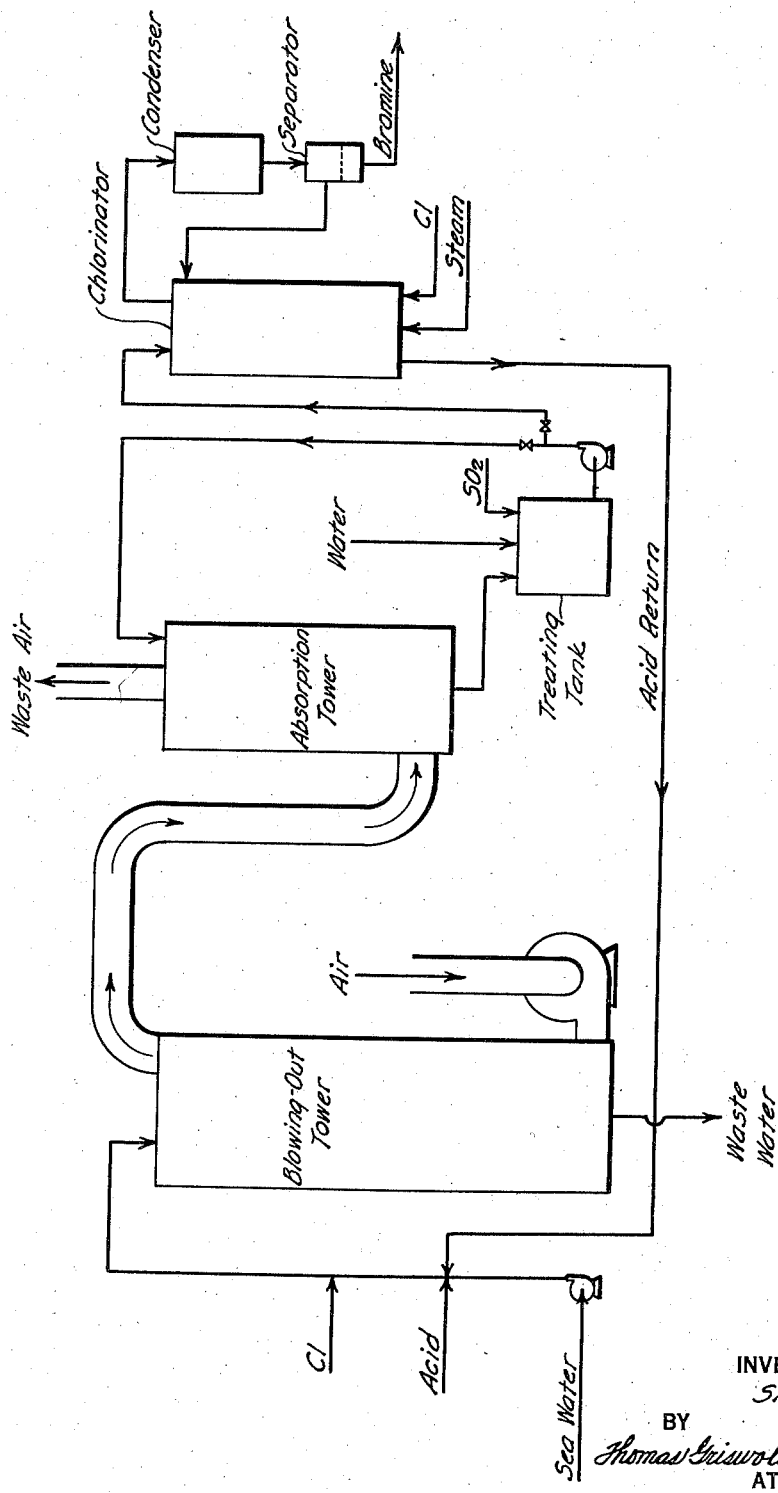

2,143,223

UNITED STATES PATENT OFFICE 2,143,223

PROCESS OF PRODUCING BROMINE

Sheldon B. Heath, Midland, Mich., assignor to The Dow Chemical Company, Midland, Mich., a corporation of Michigan Application May 13, 1936, Serial No. 79,456

4 Claims. (Cl. 23—217)

The invention relates to processes for producing bromine from bromide-containing solutions, such as sea water, natural brines, bitters and the like.

Various processes are known for the manufacture of bromine from natural salines containing relatively a small proportion of a soluble bromide. One such process which has long been used commercially is known as the "blowing-out" process. In general it consists in oxidizing the brine, by chlorinating, electrolyzing or otherwise, to liberate free bromine therein, vaporizing and expelling the free bromine by blowing out with a current of air, and absorbing the bromine from the air stream by scrubbing with an alkali solution.

The blowing-out method is subject to certain disadvantages which add to the cost of extraction and limit the recovery of the bromine. For instance, in the absorption step with an alkali considerable losses of unabsorbed bromine occur in the waste gases, which losses cannot be recovered at a practical cost. Again, the alkali scrubbing solution employed must be relatively dilute, having an alkali concentration not over about 5 per cent. Even under the best conditions the alkali content of the solution can be reacted only to the extent of 60 to 70 per cent of the total, for at a higher degree of saturation the reaction of bromine and alkali tends to reverse itself, causing an increase in vaporization losses. Very large contact surfaces are required in the absorption step and correspondingly large volumes of scrubbing solution in comparison with the amount of bromine to be absorbed, thus increasing both plant and operating costs, while the finished scrubbing liquor has a bromine content on the order of only about 5 per cent or less.

It is among the objects of the invention to improve the degree of recovery of bromine from the bromine-laden air stream in a blowing-out process. Another object is to provide a more effective absorbing agent for the bromine. Still another object is to decrease the consumption of materials in the process. The foregoing and other objects are accomplished by the invention which is hereinafter fully described in the annexed drawing and following specification, and particularly defined in the claims.

In said annexed drawing:—

The single figure represents in diagrammatic fashion an arrangement of apparatus for extracting bromine from a brine or sea water according to the invention.

The aforesaid disadvantages connected with the use of an alkaline agent for absorbing bromine from the air stream in a blowing-out process, I have found, can be largely eliminated by the use of an acid scrubbing liquor or solution which is capable of chemically reducing bromine to hydrobromic acid. Such acid scrubbing liquor consists of a solution of sulphurous acid, which in use accumulates a content of hydrobromic acid and sulphuric acid. Sulphur dioxide or sulphurous acid reduces bromine to hydrobromic acid according to the equation;

$$Br_2 + SO_2 + 2H_2O \rightarrow 2HBr + H_2SO_4$$

The acid solution thereby formed has a certain solubility for bromine, which assists in absorbing bromine from the air stream when the latter is scrubbed with the solution. I have found that a sulphurous acid solution is a much more effective agent for absorbing bromine from a bromine-laden air stream than the alkaline solutions hitherto used, so that a much smaller contact area is required in the absorption apparatus to give the same or a better degree of absorption.

In carrying out the present improved method or process either in countercurrent or parallel flow, the bromine-laden air stream is passed through an absorber tower of usual construction which is filled with a suitable packing material, e. g. Raschig rings or other ceramic packing material, coke or the equivalent, and there intimately contacted with an aqueous solution of sulphurous acid. The scrubbing solution absorbs the bromine vapors from the air stream by chemical combination in accordance with the above equation. The solution discharged from the bottom of the absorber, which may contain an excess of free bromine dissolved therein or not, as the case may be, flows to a tank in which it is treated with sulphur dioxide to reduce any free bromine present and to replace the sulphurous acid consumed in the absorption tower. The revivified solution can then be recirculated over the tower, thus enabling a continuous operation of the absorption. Hydrobromic acid and sulphuric acid accumulate in the scrubbing liquor until a sufficient concentration is built up, e. g. from 10 to 20 per cent of hydrobromic acid, whereupon the solution may be withdrawn for treatment to recover the bromine therefrom.

The efficiency of absorption of the bromine in any particular case is a function of the apparatus employed, depending upon the height and cross-section of the tower in proportion to the volume and velocity of air flow, as well as the type, size and depth of the packing, and the rate of circulation of the scrubbing agent, as is well understood by those skilled in the art. The method of the present invention, where a proper balance of the design factors of the apparatus is provided, permits a substantially complete absorption of the bromine in the air stream, whereas under otherwise similar conditions an alkaline absorbent, e. g. 5 per cent sodium carbonate solution, would give only about 75 per cent absorption. Furthermore, even by greatly increasing the size of apparatus and volume of absorbing solution in proportion to air flow, it has not been found practically possible to recover all of the bromine in the air stream as obtained in a blowing-out process, in which the bromine content of the air stream is normally on the order of one pound to from 20,000 to 40,000 cubic feet of air.

As a specific illustration of the application of the invention the extraction of bromine from sea water is taken, the bromine content of which is approximately 60 to 65 parts per million. Referring to the drawing, the sea water, after settling and clarification, if necesary, is pumped to the top of a blowing-out tower, while acid and chlorine are added thereto, as shown, in sufficient amount to acidify the water and to liberate the bromine in the elemental state. In the blowing-out tower, which is filled with packing material, the acidified and oxidized sea water flows in countercurrent to a voluminous current of air introduced by a blower at the base of the tower. The air thus brought in intimate contact with the descending flow of sea water vaporizes and blows out the free bromine. The bromine-laden air stream passes out from the top of the tower and through a duct to an absorption tower of similar construction to the blowing-out tower. In the absorption tower the air stream is scrubbed by a sulphurous acid solution to absorb the bromine, and the stripped air is vented at the top. The scrubbing solution containing the chemically combined bromine flows from the absorber into a treating tank, where sulphur dioxide is added to replace the sulphurous acid consumed in passage through the absorption tower. The acid liquor is then recirculated from the treating tank to the top of the absorption tower.

The absorber liquor gradually builds up a concentration of hydrobromic acid and sulphuric acid, which is allowed to accumulate until the solution is of the desired strength, e. g. from 10 to 20 per cent of hydrobromic acid. The solution may then be withdrawn for further treatment to recover bromine therefrom. It is convenient to bleed off a portion of the absorber liquor continuously or intermittently to a chlorinator, while water is added to the treating tank to maintain the volume of the solution. In the chlorinator the strong solution of hydrobromic acid and sulphuric acid is treated with chlorine to liberate the bromine, and steam is admitted to vaporize the free bromine, which passes off with the steam to a condenser in which the liquids are condensed. The condensate flows to a separator in which it separates into a layer of liquid bromine and an upper water layer saturated with bromine and also containing some hydrobromic acid. The bromine is drawn off and may be further purified in known manner, while the aqueous layer is returned to the chlorinator.

The debrominated acid solution from the chlorinator, containing sulphuric acid and hydrochloric acid, as well as traces of bromine, is drawn off and returned to the beginning of the process to supply at least a portion of the acid required to acidify the sea water, also returning to the process any bromine which escaped vaporization in the chlorinator.

When carried out in the manner described, under proper regulation and balance of air and solution flow in the absorption step, it is feasible to recover substantially all of the bromine in the air stream, the losses thereof in the waste gases being negligible.

Various modifications of the procedure just described, as will be apparent to those skilled in the art, may be made without departing from the scope of the invention. The principal feature of novelty lies in the absorption of bromine from the air stream by contacting the latter with an aqueous scrubbing solution containing sulphurous acid. In continuous operation the acid scrubbing solution is treated with sulphur dioxide in proportion to the bromine absorbed, so as to maintain a suitable concentration of sulphurous acid therein. The method of the invention has an advantage over the known method of absorption of bromine by means of an alkali solution in numerous respects, including the following:—(1) The absorbing agent, e. g. sulphur dioxide or sulphurous acid, can be completely reacted instead of only partially so; (2) there is a saving of materials in the elimination of the alkali, as well as of the additional acid required to neutralize the unreacted excess of alkali; (3) a much higher concentration of combined bromine can be obtained in the absorber liquor; (4) a considerably higher degree of removal of bromine from the air stream can be secured; (5) such recovery can be had with a much smaller and more compact apparatus; and (6) the sulphuric acid produced along with the hydrobromic acid in the absorption can, after removal of the bromine, be used to acidify the sea water or brine entering the process.

Procedure similar to that above described can be used to extract bromine from other salines, such as natural brines or bitterns, which may have a higher bromine content than that of sea water. The solution of hydrobromic acid and sulphuric acid obtained in the absorption step may be worked up by other procedure than that described in order to recover the bromine therefrom either in elemental or combined form, according to known methods.

In the blowing-out step any other gas inert to bromine may be used instead of air, such as carbon dioxide, nitrogen, combustion gases, etc., although in most cases air will be most economical. In the absorption step of the present process the general method herein described is suitable to absorb bromine vapors from any such inert gas.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:—

1. The process of producing bromine from a bromide-containing solution, which comprises liberating the bromine therein, blowing out the bromine with a current of air, removing bromine from the air stream by scrubbing with an acid liquor containing sulphurous acid and hydrobromic acid, chlorinating the resulting solution of hydrobromic acid and sulphuric acid to liberate free bromine therefrom, and separating the bromine.

2. The process of extracting bromine from a natural saline solution, which comprises acidifying the solution, oxidizing to liberate bromine therein, blowing out the bromine with a current of air, removing bromine from the air stream by scrubbing with an acid liquor containing sulphurous acid and hydrobromic acid, chlorinating the resulting solution to liberate free bromine therefrom, separating the bromine from the solution of sulphuric acid and hydrochloric acid thereby formed and returning such acid solution to the first step for acidifying the solution entering the process.

3. In a process of extracting bromine from a bromide-containing solution, the steps which consist in liberatng the bromine in the solution by oxidation, vaporizing the liberated bromine by blowing out with a current of inert gas such as air, and removing such vaporized bromine from the gas stream by intimately contacting the latter with an aqueous acid solution containing sulphurous acid.

4. In a process of extracting bromine from a bromide-containing solution, the steps which consist in liberating the bromine in the solution by oxidation, vaporizing the liberated bromine by blowing out with a current of air, recovering bromine from the bromine-laden air stream by scrubbing the latter with an aqueous acid solution containing sulphurous acid, adding sulphur dioxide to the scrubbing solution to replace the sulphurous acid reacted and recycling the solution in the scrubbing step.

SHELDON B. HEATH.